June 23, 1925.  
W. H. FULLINGTON  
THREAD CUTTER  
Filed March 6, 1924

1,542,932

2 Sheets-Sheet 1

Inventor  
William H. Fullington  
John A. Bommhardt  
By  
Attorney

June 23, 1925.
W. H. FULLINGTON
THREAD CUTTER
Filed March 6, 1924
1,542,932
2 Sheets-Sheet 2
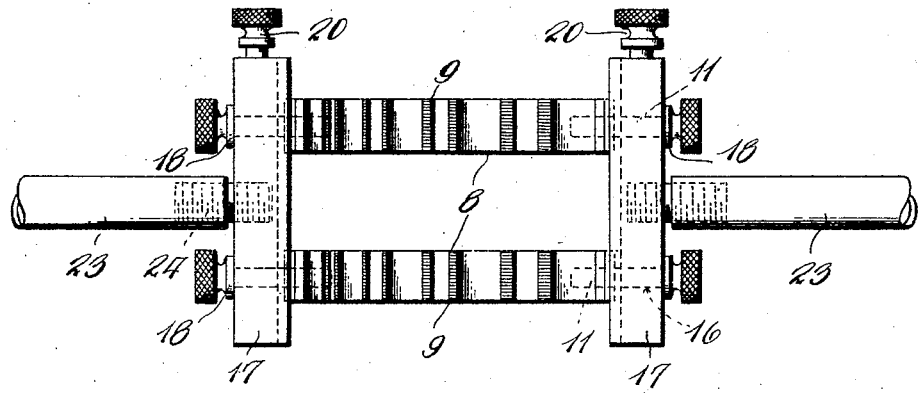
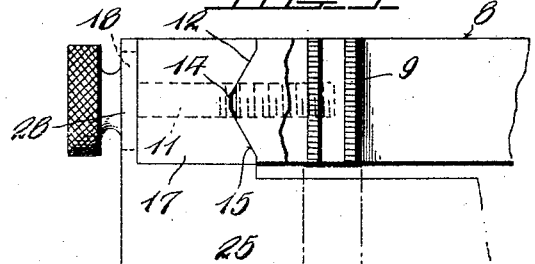
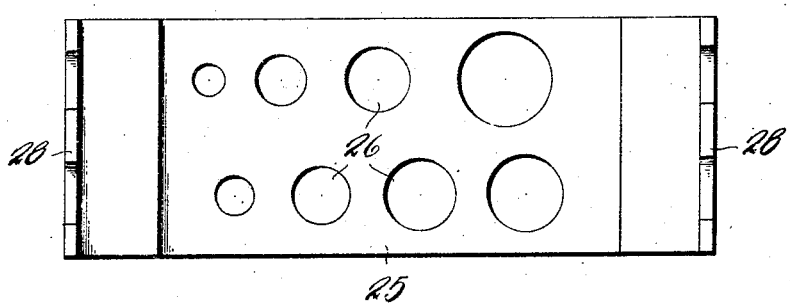
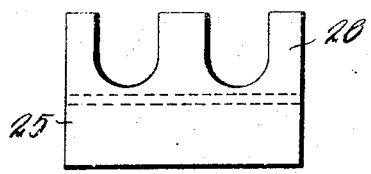
Inventor
William H. Fullington
By John A. Bommhardt
Attorney Patented June 23, 1925.

1,542,932

UNITED STATES PATENT OFFICE.

WILLIAM H. FULLINGTON, OF CLEVELAND, OHIO, ASSIGNOR TO KATHARINE J. RIDDELL, OF CLEVELAND, OHIO.

THREAD CUTTER.

Application filed March 6, 1924. Serial No. 697,249.

*To all whom it may concern:*

Be it known that I, WILLIAM H. FULLINGTON, citizen of the United States, residing at Cleveland, in the county of Cuyahoga and State of Ohio, have invented certain new and useful Improvements in Thread Cutters, of which the following is a specification.

This invention relates to improvements in thread cutters, having for an object to provide a cutter in which accurate adjustment of the parts may be had to permit cutting of a number of different sized threads.

Another object is to provide a cutter in which the die plates may be easily and quickly shifted from one position to another to bring into operative position a second set of cutting jaws and to provide means for positively preventing relative movement of the plates after setting.

A further object is to provide a cutter including guide means whereby to insure true cutting of the threads upon the rod or the like.

It is likewise an object to provide a tool of this character in which the parts are compactly formed to reduce the quantity of material necessary in its construction, thereby lessening the cost of manufacture.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

Figure 1:
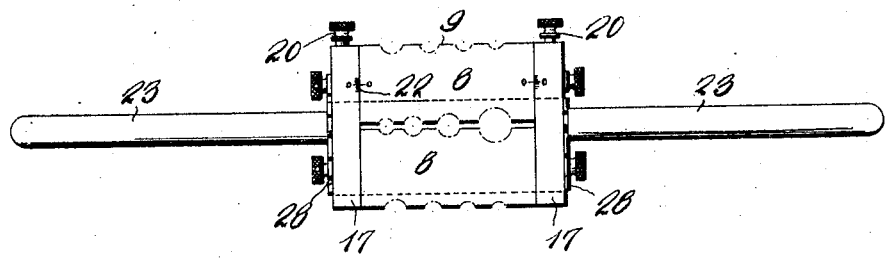
Figure 2:
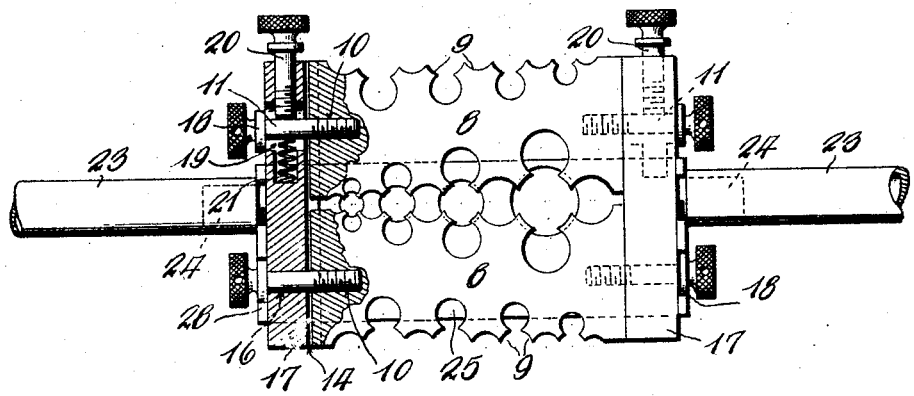
Figure 3:
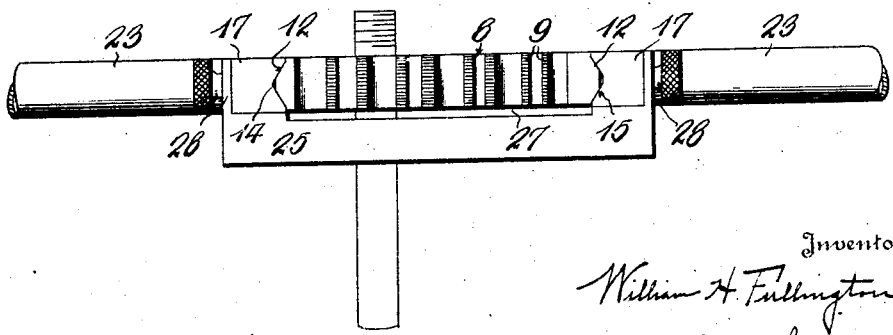

In these drawings:

Fig. 1. is a plan view of the cutter, the position of the cutting jaws being indicated in dotted lines;

Fig. 2. is a detail plan view partly in section, showing the connection between the die plates and the bolsters;

Fig. 3 is an edge view thereof;

Fig. 4. is a plan view showing the die plates partially turned.

Fig. 5. is an enlarged detail view showing the connection between the die-plate, bolster and guide plate.

Fig. 6. is a plan view of the guide plate;

Fig. 7. is an end view of the guide plate.

Having more particular reference to the drawing throughout which similar characters of reference designate similar parts, this thread cutter may be stated as comprising a pair of die plates 8 which as shown may be provided upon each longitudinal edge with spaced die faces 9. As shown in Figure 2, these die faces are arranged to cut a number of different sized threads and through utilization of an adjusting means later pointed out, may be employed to cut an unlimited number of bastard threads. Arranged centrally at each end of each die plate 8 is a threaded socket 10 adapted for the reception of the threaded portion of a bolt 11, which as shown serves to interconnect the plates 8 and bolsters at the ends. In order to facilitate assembly and to insure accurate centering of the plates and the rigidity thereof, each has its end 12, cut or formed substantially V-shaped in longitudinal section, the apex of the V being cut away and adapted, when the cutter is assembled, to be slightly spaced from the flattened bottom 14 of a V-shaped channel 15 formed in each bolster. Abutting shoulders are formed at the opposite edges of the channels and V-shaped ends of the die plates. It is apparent that in assembling, the plates will center themselves, and in use there will be no possibility of relative shifting of position as regards the plates and bolsters.

Rigid connection between one of the die plates and the bolsters is provided through the bolts 11 being snugly fitted in openings 16 formed in the bolsters 17 and drawing the two members closely together. An annular rib or shoulder 18 is carried by each bolt 11 and bears against the outer face of the bolster and upon turning the bolt, which is accomplished through manipulation of the knurled head, the plate is drawn into engagement with the bolster. Through providing an opening in each knurled head, an instrument may be inserted and employed to tighten the bolt.

Corresponding end portions of the bolsters 17 are provided with elongated ways or openings 19 in which the unthreaded portion of connecting bolts 11 are disposed. As is apparent in Figure 2, the movable die plate 8 may be adjusted toward or away from the other plate due to the provision of the pair of adjusting screws or bolts 20 having contact with one side of the connecting bolts 11 and the arrangement of coil expansion springs or the like 21 upon the other side of said bolt. The springs move the movable die plate outwardly into contact with the adjusting bolts or screws 20 which in turn limit said outward movement. As shown in Figure 1, the movable die plate and the bolsters are provided with indicia or graduations 22 whereby determination of proper setting of the members is possible.

In order to provide for operation of the cutter, handle members 23 are arranged upon the bolsters, and are connected thereto through forming upon each bolster a threaded stem 24 engageable in an internally threaded socket in the end of each handle member. As is apparent these handles are readily detachable.

Rods or the like being threaded must be accurately fed or directed into the cutter and to accomplish this I provide a guide plate 25 having a set of spaced openings 26 arrangeable as shown in Figure 2, thus serving to accurately guide the rods as is obvious. The upper face of the guide plate may be cut away to provide a passageway or recess 27 into which the excess material cut from the rods may pass. A pair of upstanding yokes 28 is formed upon the ends of the guide plate, these yokes being positioned to straddle the threaded stems 24 on the bolsters and the annular ribs carried by the bolts 11 which are employed to connect the rigid die plate and the bolsters.

It is obvious that in using this cutter, the parts are positioned as shown in Figure 2, after which it is guided upon the rod or the like to be threaded. Fine adjustment is had through turning the adjusting screws or bolts in the bolsters. If it is necessary to use the die faces which are positioned upon the outer edges, the four connecting bolts 11 are loosened sufficiently to permit separation of the two bolsters a distance whereat the die plates may be revolved. The plates are properly placed and the bolts 11 are again tightened, thus arranging the parts for use. It is seen that in this operation the unthreaded portions of the bolts 11 serve as bearings or axes upon which the die plates 8 are revolved.

Due to the positioning of the die faces in proximity to each other it is obvious that a considerable saving in material is effected.

Manifestly, the construction shown is capable of considerable modification and such modification as may fall within the scope of my claims, I consider within the spirit of my invention.

I claim:

1. A thread cutter comprising a pair of bolsters, a pair of die plates arranged between and removably connected to the bolsters, a guide plate arranged below and carried by the bolsters, and operating handles carried by the cutter.

2. A thread cutter comprising a pair of bolsters, a pair of die plates arranged between and removably connected to the bolsters, connection between the plates and bolsters to permit the plates to be revolved upon their axes upon separation of the bolsters, and operating handles for the cutter.

3. A thread cutter comprising a pair of bolsters, a pair of die plates arranged between and removably connected to the bolsters, said plates being revolvable upon their longitudinal axes upon separation of the bolsters, a removable guide plate arranged upon the under side of the die plates, and operating handles for the cutter.

4. A thread cutter comprising a pair of bolsters having channeled inner faces, a pair of die plates having their ends receivable in the channels, bolts carried by the bolsters and axially connected to the die plates to permit revolving the plates at certain times, and operating handles for the cutter.

5. A thread cutter comprising a pair of bolsters having channeled inner faces, a pair of die plates having their ends formed to fit in said channels, one plate being rigidly positioned between the bolsters, the other plate being adjustable toward and away from the first plate, devices to move the adjustable plate inwardly, means for yieldably exerting an outward pressure on said adjustable plate and operating handles for the cutter.

6. A thread cutter comprising a pair of bolsters each having a bolt hole and a slot spaced from the bolt hole, a pair of die plates arranged between the bolsters, and having axially disposed threaded sockets in the ends, bolts arranged in the slots and bolt holes, and engaging the threaded sockets to retain the plates in position, a pair of adjusting screws carried by the bolsters and extending into the slots to engage the bolts, spring means to retain the adjusting screws and the bolts inter-engaged and operating handles for the cutter.

7. A thread cutter comprising a pair of bolsters, a pair of transversely spaced bolts carried by each bolster, a pair of die plates having die faces on each longitudinal edge, said bolts being threadedly connected to the ends of the plates and at times serving to permit rotation of said plates, one plate being fixed, the other plate being adjustable toward and from the fixed plate, and operating handles on the bolsters.

In testimony whereof, I affix my signature.

WILLIAM H. FULLINGTON.